US006986040B1

(12) United States Patent
Kramer et al.

(10) Patent No.: US 6,986,040 B1
(45) Date of Patent: Jan. 10, 2006

(54) SYSTEM AND METHOD OF EXPLOITING THE SECURITY OF A SECURE COMMUNICATION CHANNEL TO SECURE A NON-SECURE COMMUNICATION CHANNEL

(75) Inventors: Andre Kramer, Cambridge (GB); Will Harwood, Great Shelford (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 738 days.

(21) Appl. No.: 09/706,117

(22) Filed: Nov. 3, 2000

(51) Int. Cl.
*H04L 9/00* (2006.01)

(52) U.S. Cl. .................. 713/155; 713/152; 713/168; 713/200; 713/201; 713/202; 380/255; 380/277; 380/28; 705/50; 705/53; 705/65; 705/67; 705/71; 705/75; 705/78

(58) Field of Classification Search ............... 713/155, 713/200–202, 152, 168; 380/255, 277, 28
See application file for complete search history.

(56) References Cited

U.S. PATENT DOCUMENTS

| 4,649,410 A | 3/1987 | Ohashi |
| 4,807,029 A | 2/1989 | Tanaka |
| 4,887,204 A | 12/1989 | Johnson et al. |
| 4,924,378 A | 5/1990 | Hershey et al. ............. 364/200 |
| 4,937,784 A | 6/1990 | Masai et al. |
| 5,014,221 A | 5/1991 | Mogul |
| 5,161,015 A | 11/1992 | Citta et al. |
| 5,164,727 A | 11/1992 | Zakhor et al. |
| 5,175,852 A | 12/1992 | Johnson et al. |
| 5,202,971 A | 4/1993 | Henson et al. |
| 5,204,897 A | 4/1993 | Wyman ........................ 380/4 |
| 5,229,864 A | 7/1993 | Moronaga et al. |
| 5,305,440 A | 4/1994 | Morgan et al. |
| 5,325,527 A | 6/1994 | Cwikowski et al. |
| 5,329,619 A | 7/1994 | Page et al. |
| 5,341,477 A | 8/1994 | Pitkin et al. |
| 5,341,478 A | 8/1994 | Travis, Jr. et al. |
| 5,351,293 A | 9/1994 | Michener et al. |
| 5,359,721 A | 10/1994 | Kempf et al. ............... 395/425 |
| 5,367,688 A | 11/1994 | Croll |

(Continued)

FOREIGN PATENT DOCUMENTS

EP          0 643 514 A2       3/1995

(Continued)

OTHER PUBLICATIONS

Terao et al, A Shared Secure Server for Multiple Closed Networks, 1999, IEEE, pp. 32-39.*

(Continued)

*Primary Examiner*—Ayaz Sheikh
*Assistant Examiner*—Aravind K Moorthy
(74) *Attorney, Agent, or Firm*—Lahive & Cockfield, LLP; John D. Lanza

(57) ABSTRACT

The present invention features a system and method for establishing a secure communication channel between a client and an application server. In one embodiment, a ticket service generates a ticket having an identifier and a session key. A communications device obtains the ticket from the ticket service and transmits the ticket to a client over a secure communication channel. The client transmits the identifier of the ticket to an application server over an application communication channel. The application server then obtains a copy of the session key of the ticket from the ticket service. Communications exchanged between the client and the application server over the application communication channel are then encrypted using the session key to establish the application communication channel as a secure communication channel.

89 Claims, 2 Drawing Sheets

U.S. PATENT DOCUMENTS

| | | |
|---|---|---|
| 5,390,297 A | 2/1995 | Barber et al. ............... 395/200 |
| 5,412,717 A | 5/1995 | Fischer ........................... 380/4 |
| 5,440,719 A | 8/1995 | Hanes et al. |
| 5,455,953 A | 10/1995 | Russell ....................... 395/739 |
| 5,475,757 A | 12/1995 | Kelly |
| 5,491,750 A | 2/1996 | Bellare et al. ................ 380/21 |
| 5,504,814 A | 4/1996 | Miyahara ....................... 380/4 |
| 5,509,070 A | 4/1996 | Schull ........................... 380/4 |
| 5,515,508 A | 5/1996 | Pettus et al. |
| 5,524,238 A | 6/1996 | Miller et al. ................ 395/600 |
| 5,544,246 A | 8/1996 | Mandelbaum et al. ........ 380/23 |
| 5,550,976 A | 8/1996 | Henderson et al. .... 395/200.06 |
| 5,550,981 A | 8/1996 | Bauer et al. ........... 395/200.06 |
| 5,553,139 A | 9/1996 | Ross et al. ..................... 380/4 |
| 5,557,732 A | 9/1996 | Thompson .................. 395/161 |
| 5,560,008 A * | 9/1996 | Johnson et al. ............. 713/201 |
| 5,564,016 A | 10/1996 | Korenshtein ................ 395/186 |
| 5,583,992 A | 12/1996 | Kudo |
| 5,590,199 A * | 12/1996 | Krajewski et al. .......... 713/159 |
| 5,592,549 A | 1/1997 | Nagel et al. ..................... 380/4 |
| 5,604,490 A | 2/1997 | Blakley, III et al. .... 340/825.31 |
| 5,638,513 A | 6/1997 | Ananda .................. 395/188.01 |
| 5,657,390 A | 8/1997 | Elgamal et al. ............... 380/49 |
| 5,666,501 A | 9/1997 | Jones et al. .................. 345/348 |
| 5,668,876 A | 9/1997 | Falk et al. |
| 5,668,999 A | 9/1997 | Gosling ....................... 395/704 |
| 5,671,354 A | 9/1997 | Ito et al. |
| 5,689,708 A | 11/1997 | Regnier et al. ............. 395/682 |
| 5,706,349 A | 1/1998 | Aditham et al. .............. 380/25 |
| 5,729,734 A | 3/1998 | Parker et al. ................ 395/609 |
| 5,737,416 A | 4/1998 | Cooper et al. ................. 380/4 |
| 5,742,757 A | 4/1998 | Hamadani et al. .......... 395/186 |
| 5,787,169 A | 7/1998 | Eldridge et al. |
| 5,794,207 A | 8/1998 | Walker et al. ................ 705/23 |
| 5,809,144 A * | 9/1998 | Sirbu et al. ................... 705/53 |
| 5,818,939 A * | 10/1998 | Davis ......................... 713/192 |
| 5,881,226 A | 3/1999 | Veneklase |
| 5,918,228 A * | 6/1999 | Rich et al. ..................... 707/10 |
| 5,923,756 A * | 7/1999 | Shambroom ................ 713/156 |
| 5,944,791 A | 8/1999 | Scherpbier .................. 709/218 |
| 5,956,407 A | 9/1999 | Slavin ........................... 380/30 |
| 5,991,878 A * | 11/1999 | McDonough et al. ....... 713/200 |
| 6,035,405 A | 3/2000 | Gage et al. |
| 6,049,785 A * | 4/2000 | Gifford ......................... 705/39 |
| 6,078,908 A | 6/2000 | Schmitz |
| 6,088,450 A | 7/2000 | Davis et al. |
| 6,094,485 A * | 7/2000 | Weinstein et al. ............. 380/30 |
| 6,108,787 A * | 8/2000 | Anderson et al. ........... 713/201 |
| 6,128,742 A | 10/2000 | Felt |
| 6,131,116 A | 10/2000 | Riggins et al. |
| 6,178,508 B1 | 1/2001 | Kaufman |
| 6,226,383 B1 | 5/2001 | Jablon |
| 6,246,771 B1 * | 6/2001 | Stanton et al. .............. 380/286 |
| 6,286,104 B1 | 9/2001 | Buhle et al. |
| 6,289,461 B1 | 9/2001 | Dixon |
| 6,363,365 B1 * | 3/2002 | Kou ............................. 705/64 |
| 6,542,933 B1 * | 4/2003 | Durst et al. ................. 709/229 |
| 6,609,206 B1 | 8/2003 | Veneklase |
| 6,651,072 B1 * | 11/2003 | Carino, Jr. et al. ........... 707/10 |
| 6,732,269 B1 * | 5/2004 | Baskey et al. .............. 713/153 |
| 6,757,825 B1 | 6/2004 | MacKenzie et al. |
| 6,789,194 B1 * | 9/2004 | Lapstun et al. ............. 713/176 |
| 6,792,424 B1 * | 9/2004 | Burns et al. ................... 707/9 |
| 6,862,105 B2 * | 3/2005 | Silverbrook et al. ....... 358/1.15 |
| 6,865,551 B1 * | 3/2005 | Stefik et al. .................. 705/51 |
| 2001/0056547 A1 | 12/2001 | Dixon |

FOREIGN PATENT DOCUMENTS

| | | |
|---|---|---|
| EP | 0 679 980 A1 | 11/1995 |
| EP | 0 734 144 A2 | 9/1996 |
| EP | 0 851 628 A1 | 7/1998 |
| EP | 0 875 871 A2 | 11/1998 |
| EP | 1439495 A1 * | 7/2004 |
| GB | 2 168 831 A | 6/1986 |
| NL | 1007409 | 11/1997 |
| WO | WO 93/15457 A1 | 8/1993 |
| WO | WO 94/28670 A1 | 12/1994 |
| WO | 97/18635 | 5/1997 |
| WO | 98/38762 | 9/1998 |
| WO | WO 98/52344 | 11/1998 |
| WO | 99/35783 | 7/1999 |

OTHER PUBLICATIONS

Conry-Marray, Andrew, Web Services Security Specifications, 2003, Network Magazine, pp. 20 and 22.*

Takura et al, A Secure and Trusted Time Stamping Authority, 1999, IEEE, pp. 88-93.*

Fontana, John, Interoperability issues bite Win 2000 Kerberos Scheme, 1999, Network World, p. 8.*

Denker et al, Cross-Domain Access Control via PKI, 2002, IEEE, pp. 202-205.*

Wu et al, Secure and Efficient Key Management in Mobile Ad Hoc Networks, 2005, IEEE, pp. 288-295.*

IBM: "IBM Operating System/2 Version 1.2 Profile Validation Hooks", pp. 1-26, Nov. 22, 1989.

N.F. Maxemchuk, S. Low, "The Use of Communications Networks to Increase Personal Privacy" *IEEE INFOCOM' 95*, Proceedings, vol. 2, Apr. 2-6, 1995, pp. 504-512.

P.Y.A. Ryan, S.A. Schneider, "An attack on a recursive authentication protocol A cautionary tale" *Information Processing Letters 65*, 1998 Elsevier Science B.V., pp. 7-10.

Dave Otway and Owen Rees, "Efficient and Timely Mutual Authentication", The ANSA Project, 24 Hills Road, Cambridge CB21JP United Kingdom, pp. 8-10.

Lawrence C. Paulson, "Mechanized Proofs for a Recursive Authentication Protocol" Computer Laboratory, University of Cambridge, Pembroke Street, Cambridge CB2 3QG, England, pp. 84-94.

Li Gong, "Using One-Way Functions for Authentication" University of Cambridge Computer Laboratory, Cambridge CB2 3QG, England, Jul. 1989, pp. 8-11.

Mark Nicholson, "How To Hold Mobile Users To Account" Financial Times, Tuesday, May 2, 2000.

Tony Savvas, "Handset Giants Launch Security System" www.computerweekly.com.

Charles Seife, "Algorithmic Gladiators Vie For Digital Glory" www.sciencemag.org, Science, vol. 288, May 19, 2000, pp. 1611 & 1163.

Russell Kay, "Authentication" Computerworld, Mar. 27, 2000, pp. 77-79.

Tom Yager, "OS Paradise" BYTE, Nov., 1995.

Bridget Allison, Robert Hawley, Andrea Borr, Mark Muhlestein, David Hitz, "File System Security: Secure NetFwork Data Sharing For NT And UNIX" Network Appliance, Inc., Tech Library, Jan. 16, 1998 pp. 1-16 (double sided).

"Network Neighborhood", http://www.internet.com, © 1999 internet.com.

Howard Millman, "Give Your Computer the Finger", Computerworld, Mar. 27, 2000.

B. Clifford Neuman, "Proxy-Based Authorization and Accounting for Distributed Systems", © IEEE, May 25, 1993, pp. 283-291.

Win95 Tutorial: Index of Topics, http://orion.valencia.cc.fl.us/tutorials/Win95demo/net.html, printed Dec. 27, 1999 (2 pages).

Patent Cooperation Treaty, International Search Report, International Application No. PCT/US 01/45461, mailed on Nov. 13, 2002, 7 pages.

Sirbu et al., "Distributed Authentication in Kerberos Using Public Key Cryptography," Carnegie Mellon University, 1997.

Stallings, William, "Cryptography and Network Security: Principles and Practice—Confidentiality Using Conventional Encryption," Prentice Hall, pp. 131-157, 1998.

Dawson et al., "Key Management in a Non-Trusted Distributed Environment," *Future Generation Computer Systems*, Elsevier Science Publishers, Amsterdam, vol. 16, No. 4, pp. 319-329, Feb. 2000.

Jeong, et al. "Mutual Authentication Protocols for the Virtual Home Environment in 3G Mobile Network." *IEEE*. 2002; 1658-62.

Totty, P. "Staying one step ahead of the hackers." *Credit Union Magazine*. 2001; 39-41.

Shieh, et al. "An Authentication Protocol Without Trusted Third Party." *IEEE*. 1997; 87-89.

Keung, et al. "Efficient Protocols Secure Against Guessing and Replay Attacks." *IEEE*. 1995; 105-12.

* cited by examiner

SYSTEM AND METHOD OF EXPLOITING THE SECURITY OF A SECURE COMMUNICATION CHANNEL TO SECURE A NON-SECURE COMMUNICATION CHANNEL

FIELD OF THE INVENTION

The invention relates generally to client-server computer networks. More specifically, the invention relates to a system and method for securely accessing software applications using a remote display protocol.

BACKGROUND OF THE INVENTION

Software applications that are requested to be remotely displayed on a client computer, or client, are commonly accessed with a graphical or windowing terminal session. When a user requests an application on a client computer, the application executes on a server and typically the input information (e.g., mouse and keyboard information) and display information are transmitted from the server computer to the client computer. Graphical or windowing terminal sessions often make use of unauthenticated connections between the client and the server. Alternatively, the graphical or windowing terminal session may authenticate the connection between the client and the server with the user supplying his password to the server.

The aforementioned techniques employed by the terminal sessions have various shortcomings. For example, transmitting information, such as password information, to an unauthenticated server allows the information to be viewed by a server that is not trusted by the client. The non-secure connection permits an eavesdropper to intercept a user's password for future use.

To avoid these problems, the client and server are typically authenticated using conventional cryptographic techniques. One type of cryptographic technique used by networks is a ticket-based authentication scheme. Most current ticket-based authentication schemes transmit a ticket. The ticket, which can typically be used only one time, may contain an encryption key to be used in future communications and/or may contain a secret password to support the future communications. When the client and the server both have the encryption key, they can communicate securely.

However, the current ticket-based authentication schemes are limited in several areas. First, the ticket is typically transmitted to the client over a non-secure communication channel, thereby allowing an eavesdropper to intercept the ticket and retrieve the encryption key. Using the encryption key, the eavesdropper can pose as the server to the client or as the client to the server. Second, the current schemes do not take advantage of secure web pages. For example, current ticket-based authentication schemes make transactions over the internet, such as purchases, unsafe because proprietary information, such as a purchaser's credit card information, can be transmitted to a non-secure web page. Third, software applications executing on a server are commonly transmitted over a non-secure communication channel for display on a remote display protocol on a client machine. For instance, networks may consist of specialized application servers (e.g., Metaframe for Windows, manufactured by Citrix Systems, Inc. of Ft. Lauderdale, Fla.), to execute specific applications which are typically transmitted to a remote display service over a non-secure communication channel. Fourth, although the ticket can typically be used only one time (i.e., making it a "one-time use" ticket) and having no further value after its first use, the one-time use ticket does not protect the user's password (which is used for login into an operating system or an application) from an eavesdropper on the ticket's first transmission. Therefore, the user's password is still not completely protected from interception and the server is consequently not authenticated to the client.

SUMMARY OF THE INVENTION

The present invention features a system and method for establishing a secure communication channel between a client and an application server. A ticket service generates a ticket having an identifier and a session key. A communications device obtains the ticket from the ticket service and transmits the ticket to a client over a secure communication channel. The client transmits the identifier of the ticket to an application server over an application communication channel. The application server then obtains a copy of the session key of the ticket from the ticket service. Communications exchanged between the client and the application server over the application communication channel are then encrypted using the session key to establish the application communication channel as a secure communication channel.

In one embodiment, a web browser executing on a client establishes communications with a web server over a secure web communication channel. The client receives a ticket having an identifier and a session key from the web server over the secure web communication channel. The client then transmits the identifier of the ticket to the application server over the application communication channel to provide the application server with information for obtaining a copy of the session key.

In one aspect, the invention relates to a method for establishing a secure communication channel between a client and an application server. The client receives a ticket having an identifier and a session key from a web server over a secure web communication channel. The client then transmits the identifier of the ticket to the application server over an application communication channel to provide the application server with information for obtaining a copy of the session key. The client establishes a secure communication channel over the application communication channel by using the session key to encrypt and decrypt communications to and from the application server. The identifier is a nonce. In one embodiment, the client and the web server use secure socket layer technology to establish the secure web communication channel.

In another aspect, the invention relates to a communications system that establishes a secure communication channel. The communications system includes a client, an application server, a communications device, and a ticket service. The ticket service generates a ticket having an identifier and a session key. The communications device is in communication with the ticket service to obtain the ticket. The client is in communication with the communications device over a secure communication channel to receive the ticket from the communications device. The application server is in communication with the client over an application communication channel to receive the identifier of the ticket from the client and in communication with the ticket service to obtain a copy of the session key from the ticket service. The application server and the client exchange communications over the application communication channel as a secure communication channel. In one embodiment, the ticket service resides on the communications device. In one embodiment, the communications device is a web server.

DESCRIPTION OF THE DRAWINGS

The aspects of the invention presented above and many of the accompanying advantages of the present invention will become better understood by referring to the included drawings, which show a system according to the preferred embodiment of the invention and in which.

DETAILED DESCRIPTION

Figure 1:
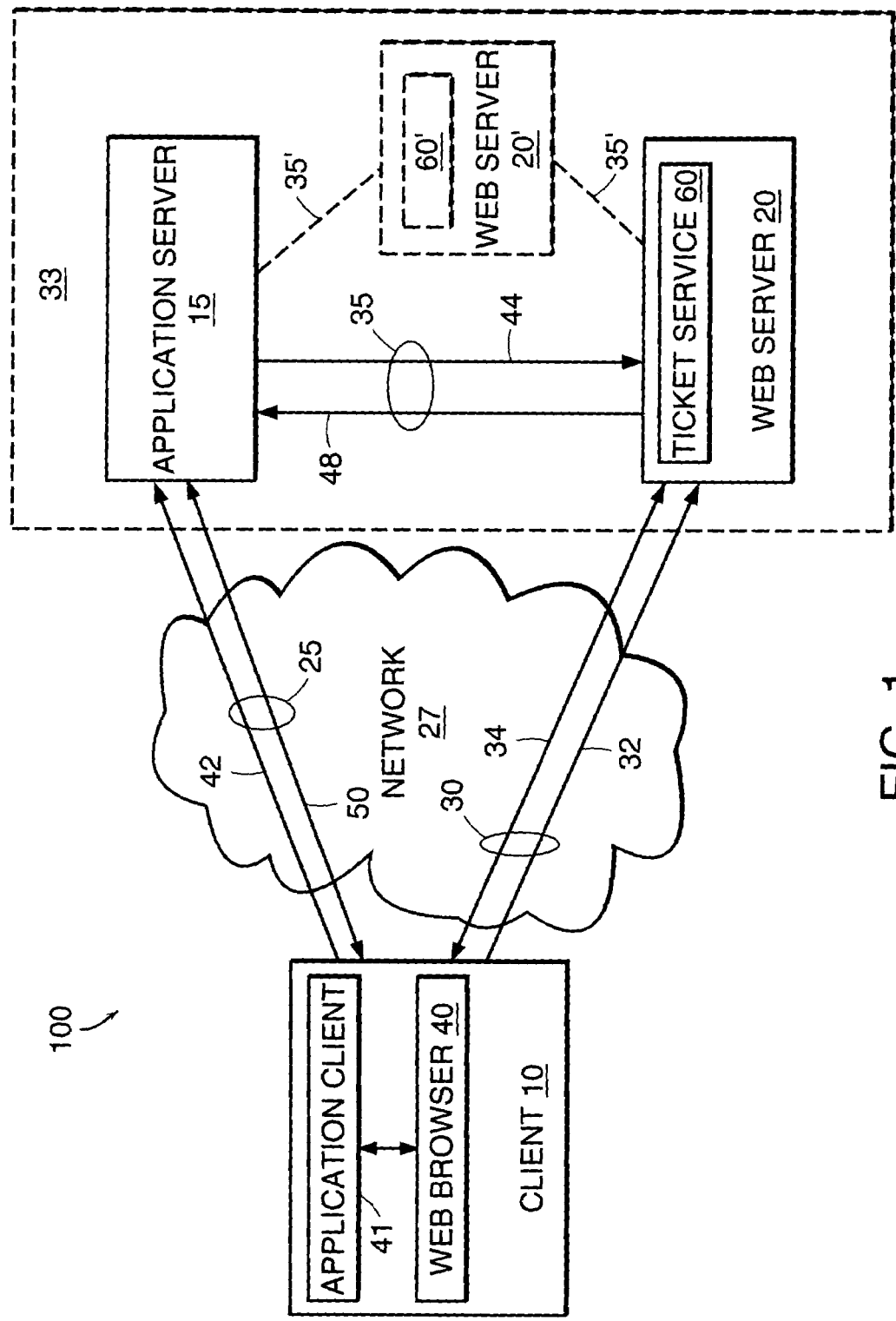
FIG. 1 is a block diagram of an embodiment of a communication system for establishing secure communications between a client and an application server in accordance with the principles of the invention.

FIG. 1 shows a block diagram of an embodiment of a communication system 100 including a client 10 in communication with an application server 15 over an application communication channel 25 and in communication with a communications device 20 over a communication channel 30. The communication channel 30 and the application communication channel 25 pass through a network 27. In other embodiments, the communication channel 30 and the application channel 25 pass through other, different networks. For example, the communication channel 30 can pass through a first network (e.g., the World Wide Web) and the application communication channel 30 can pass through a second network (e.g., a direct dial-up modem connection). The communication channel 30 is a secure communication channel in that communications are encrypted. The application server 15 is additionally in communication with the communications device 20 over a server communication channel 35. The application server 15 and the communications device 20 are part of a server network 33. By exploiting the security of the secure communications between the client 10 and the communications device 20 over the secure communication channel 30, the communication system 100 establishes a secure communication link over the non-secure application communication channel 25 to remotely display desktop applications securely on the client 10.

The network 27 and the server network 33 can be a local-area network (LAN) or a wide area network (WAN), or a network of networks such as the Internet or the World Wide Web (i.e., web). The communication channel 30 can be any secure communication channel. In one embodiment, the communication channel 30 (hereafter web communication channel 30) supports communications over the web. In one embodiment, the server network 33 is a protected network that is inaccessible by the public. The server communication channel 35 traverses the server network 33 and therefore can be a non-secure communication channel. Example embodiments of the communication channels 25, 30, 35 include standard telephone lines, LAN or WAN links (e.g., T1, T3, 56 kb, X.25), broadband connections (ISDN, Frame Relay, ATM), and wireless connections. The connections over the communication channels 25, 30, 35 can be established using a variety of communication protocols (e.g., HTTP, TCP/IP, IPX, SPX, NetBIOS, Ethernet, RS232, and direct asynchronous connections).

The client 10 can be any personal computer (e.g., 286, 386, 486, Pentium, Pentium II, Macintosh computer), Windows-based terminal, Network Computer, wireless device (e.g., cellular phone), information appliance, RISC Power PC, X-device, workstation, mini computer, main frame computer, personal digital assistant, or other communications device that is capable of communicating over the secure web communication channel 30. In one embodiment, the client 10 operates according to a server-based computing model. In a server-based computing model, the execution of application programs occurs entirely on the application server 15 and the user interface, keystrokes, and mouse movements are transmitted over the application communication channel 25 to the client 10. The user interface can be text driven (e.g., DOS) or graphically driven (e.g., Windows). Platforms that can be supported by the client 10 include DOS and Windows CE for windows-based terminals.

In one embodiment, the client 10 includes a web browser 40, such as Internet Explorer™ developed by Microsoft Corporation in Redmond, Wash., to connect to the web. In a further embodiment, the web browser 40 uses the existing Secure Socket Layer (SSL) support, developed by Netscape in Mountain View, Calif., to establish the secure web communication channel 30 to communications devices such as the communications device 20. The web browser 40 also has a user interface that may be text driven or graphically driven. The output of an application executing on the application server 15 can be displayed at the client 10 via the user interface of the client 10 or the user interface of the web browser 40. Additionally, the client 10 includes an application client 41 for establishing and exchanging communications with the application server 15 over the application communication channel 25. In one embodiment, the application client 41 is the Independent Computing Architecture (ICA) client, developed by Citrix Systems, Inc. of Fort Lauderdale, Fla., and is hereafter referred to as ICA client 41. Other embodiments of the application client 41 include the Remote Desktop Protocol (RDP), developed by Microsoft Corporation of Redmond, Wash., X-Windows, developed by Massachusetts Institute of Technology of Cambridge, Mass., a data entry client in a traditional client/server application, and a Java applet.

The application server 15 hosts one or more application programs that can be accessed by the client 10. Applications made available to the client 10 for use are referred to as published applications. Examples of such applications include word processing programs such as MICROSOFT WORDS® and spreadsheet programs such as MICROSOFT EXCEL®, both manufactured by Microsoft Corporation of Redmond, Wash., financial reporting programs, customer registration programs, programs providing technical support information, customer database applications, or application set managers. In another embodiment, the application server 15 is a member of a server farm (not shown). A server farm is a logical group of one or more servers that are administered as a single entity.

In one embodiment, the communications device 20 (hereafter web server 20) is a computer that delivers web pages to the client 10. In other embodiments, the communications device 20 can be any personal computer (e.g., 286, 386, 486, Pentium, Pentium II, Macintosh computer), Windows-based terminal, Network Computer, wireless device (e.g., cellular phone), information appliance, RISC Power PC, X-device, workstation, mini computer, main frame computer, personal digital assistant, or other communications device that is capable of establishing the secure web communication channel 30 with the client 10.

In one embodiment, the web server 20 also includes a ticket service 60. The ticket service 60 controls communication security. The ticket service 60 generates a ticket containing an encryption key. The ticket is transmitted to the client 10 (i.e., the web browser 40) over the secure web communication channel 30. The transmission of the ticket to the client 10 over the secure web communication channel 30 facilitates the establishment of secure communications over the application communication channel 25 between the client 10 and the application server 15 in accordance with the principles of the invention. In another embodiment, the ticket service 60' resides on another server 20'. The server 20' (and ticket service 60') is in communication with the web server 20 and the application server 15 over a server communication channel 35'. In yet another embodiment, the ticket service 60 is a separate component (not shown) of the server network 33. The web browser 40 then sends the ticket to the ICA client 41. A technique often used to transmit application data from applications executing on the application server 15 over a secure connection to the client 10 is to transmit the application data to the client 10 through the web server 20 over the secure connection between the client 10 and the web server 20. This technique is inefficient in that communication between the application server 15 and the client 10 takes an additional "hop"; namely the web server 20. The present invention uses the ticketing mechanism to establish a secure communication link directly between the application server 15 and the client 10, thereby eliminating the intermediate transmission of application data from the application server 15 to the web server 20.

A client user requesting an application or server desktop, for example, to be remotely displayed on the client 10 first establishes a communication link 32 with the web server 20 over the web communication channel 30 and passes login and password information to the web server 20. In one embodiment, the client user uses the web browser 40 to request an application from the web server 20 that is listed on a web page displayed by the web browser 40.

In a further embodiment, the web browser 40 uses SSL to establish the secure web communication channel 30. To use the SSL protocol to establish the secure web communication channel 30, the web browser 40 or an application executing on the client 10 attempts to connect to a secure web page on the web server 20. The web server 20 then asserts the web server's identity to the client 10 by transmitting a secure web server certificate to the client 10. A certification authority (CA) issues the secure web server certificate to the web server 20. Web browsers 40 have a list of trusted CAs (i.e., public key of the CA) embedded within the software of the web browser 40. The client 10 verifies the web server certificate by decrypting the signature of the CA in the web server's certificate with the public key of the CA embedded in the web browser 40 (or application). Therefore, in order to establish a secure communication channel using SSL, the web browser 40 or the application executing on the client 10 has the public key of the CA embedded in the software prior to attempting to connect to the secure web page. Besides using the SSL protocol to establish the secure web communication channel 30, the web browser 40 can connect to the web server 20 over the web communication channel 30 using other security protocols, such as, but not limited to, Secure Hypertext Transfer Protocol (SHTTP) developed by Terisa Systems of Los Altos, Calif., HTTP over SSL (HTTPS), Private Communication Technology (PCT) developed by Microsoft Corporation of Redmond, Wash., Secure Electronic Transfer (SET), developed by Visa International, Incorporated and Mastercard International, Incorporated of Purchase, N.Y., Secure-MIME (S/MIME) developed by RSA Security of Bedford, Mass., and the like.

Once the communication link 32 is established, the web server 20 generates a ticket for the communication session. The ticket includes a first portion and a second portion. In one embodiment, the first portion, also referred to as a session identifier (ID) or nonce, is a cryptographic random number that can be used within a certain time period determined by the web server 20. The second portion is an encryption key, hereafter referred to as a session key. The web server 20 stores the ticket in local memory and then transmits (arrow 34) a copy of the ticket to the web browser 40 on the client 10.

In one embodiment, the ticket includes additional information, such as the network address of the application server 15. In another embodiment, the web server 20 independently transmits the address of the application server 15 to the client 10. For example, if the client 10 requests an application by name from the web server 20, the web server 20 converts the application name into the network address of the application. Examples of the additional information included in the ticket are, but not limited to, the time that the ticket is valid, the screen size of the application when displayed on the client 10, the bandwidth limits of the web communication channel 30 and/or the application communication channel 25, and billing information. As described more fully below, the web server 20 also associates the user's login information, such as the user's password, with the ticket stored in local memory for future retrieval by the application server 15.

The ICA client 41 obtains the ticket from the web browser 40 and subsequently transmits (arrow 42) the session ID (i.e., the first potion) of the ticket to the application server 15. The session ID can be transmitted in encrypted or cleartext form. The application server 15 decrypts the session ID, if encrypted, and transmits (arrow 44) a request to the web server 20 for a session key that corresponds to the session ID received from the client 10. The web server 20 verifies the session ID, as described below, and sends (arrow 48) the corresponding session key to the application server 15 over the server communication channel 35.

Both the application server 15 and the client 10 (i.e., the ICA client 41) now possess a copy of the session key without requiring the transmission of the ticket or the session key over the non-secure application communication channel 25. By using the session key to encrypt and decrypt the communications over the previously non-secure application communication channel 25, the client 10 and the application server 25 establish (arrow 50) a secure communication link 50 over the application communication channel 25. Moreover, the user's login information (e.g., password) is not transmitted between the client 10 and the application server 15 over the non-secure application communication channel 25. Therefore, the present invention strengthens (arrow 50) the security of the communication link 50 over the non-secure application communication channel 25 by not exposing sensitive information, such as the user's password, to eavesdroppers intercepting communications over the non-secure application communication channel 25. Additionally, because the application server 15 and the client 10 communicate with the same session key, they share a secret that was transmitted by the ticket service 60. The ticket service 60 indirectly authenticates the application server 15 and the client 10, and the ticket service 60 is vouching for each. Therefore, the authentication server 15 and the client 10 perform mutual authentication. In one embodiment, the client 10 again transmits the user's password over the web communication channel 30 to the web server 20 to provide compatibility with legacy systems (e.g., an unmodified operating system login sequence on the web server 20 that requires the client 10 to transmit the user's password multiple times).

Figure 2:
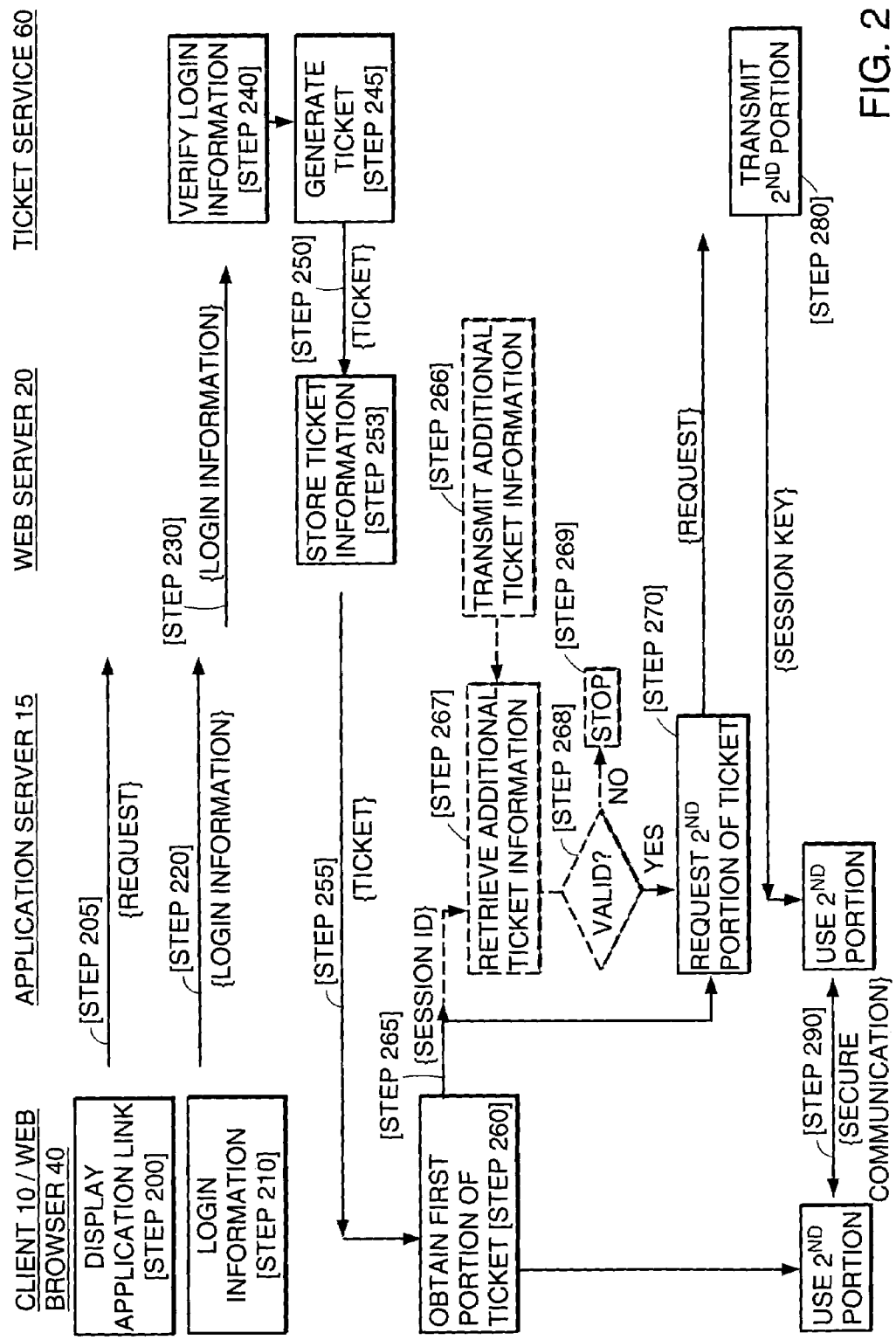
FIG. 2 is a flow diagram of an embodiment of the communications performed by the communications system shown in FIG. 1 to establish secure communications between the client and the application server.

In more detail, FIG. 2 shows embodiments of a process performed by the communications system 100 to establish a secure communication link 50 over the application communication channel 25 between the client 10 and the application server 15. The web browser 40 lists (step 200) web links to software applications or server desktops on the web page that the user of the client 10 views. The client user, using the web browser 40, requests (step 205) a software application from the web server 20. In one embodiment, the web browser 40 establishes the secure web communication channel 30 using the previously described SSL protocol. In this embodiment, the client 10 (e.g., the web browser 40) authenticates the web server 20 using a public key (e.g., X509) certificate. In a further embodiment, the client 10 is also authenticated to 1; the web server 20 using a public key certificate.

In another embodiment, the web server 20 authenticates the user when the user uses the web browser 40 to request an application from the web server 20. For example, the web server 20 requests the user's login information, which includes the user's login name and password, with a request displayed on the web browser 40. The user provides (step 210) the user's login 20 information to the web browser 40. The web browser 40 subsequently transmits (step 220) the user's login name and password to the web server 20 over the secure web communication channel 30. In another embodiment, the user's login information is any code or method that the web server 20 accepts to identify the user's account on the web server 20.

The web server 20 transmits (step 230) the user's login information to the ticket service 60. The ticket service 60 verifies (step 240) the user's login information and determines whether the user is entitled to access the requested application. Depending on the declared communication security policy for that application, the ticket service 60 either refuses or grants access to the application by the user. If the ticket service 60 denies access, the web browser 40 displays an HTML error or an error web page on the client 10. When the ticket service 60 grants access to the requested application, the ticket service 60 generates (step 245) a ticket for the session and transmits (step 250) the ticket to the web server 20.

As described above, the ticket includes a session ID and a session key. The session ID can be used once within a certain time period and makes the ticket a "one-time use" ticket having no further value after its first use. The web server 20 then stores (step 253) the ticket in local memory. In a further embodiment, the web server 20 associates the login information provided by the user in step 210 and other security information used to authorize the session, such as the requested application name, with the stored ticket for later retrieval by the application server 15. The web server 20 subsequently transmits (step 255) the ticket to the client 10 over the secure web communication channel 30.

The web browser 40 extracts (step 260) the session ID from the ticket and presents (step 265) the session ID to the application server 15. The application server 15 checks the session ID to ensure that the session ID has not been used previously with this client 10. In one embodiment, the application server 15 monitors (e.g., stores in local memory) each ticket (i.e., session ID) that the client 10 transmits to the application server 15. In another embodiment, the ticket service 60 checks the session ID to ensure that the session ID has not been used previously with this client 10. In yet another embodiment, the ticket service monitors each ticket that the ticket service 60 transmits to the web server 20 to ensure that each session ID is transmitted to the ticket service 60 only once.

The application server 15 then uses the session ID to determine the session key associated with the presented session ID. To accomplish this, the application server 15 transmits the session ID to the ticket service 60 and requests (step 270) the session key from the ticket service 60 of the web server 20 in response to the session ID. The ticket service 60 accesses local memory and uses the session ID as an index to retrieve the ticket information associated with the session ID. The ticket service 60 then returns (step 280) the session key associated with the session ID to the application server 15.

To increase optimization of the communications between the application server 15 and the web server 20, in an alternate embodiment the web server 20 transmits (shown as phantom step 266) to the application server 15 additional information (e.g., the requested application name, the user's login information) that was previously associated with the ticket in step 253. The application server 15 retrieves (phantom step 267) the additional ticket information and 1.1 authorizes the communication session from this additional information. This additional information, such as the user's password and/or the name of the requested application, was not transmitted to the application server 15 by the client 10 over the non-secure application communication channel 25, thereby protecting the information from potential attackers. In this embodiment, the application server 15 verifies (phantom step 268) the additional information. If the additional information is not valid, the application server 15 refuses (phantom step 269) access to the requested application by the user. If the additional information is valid, the application server 15 grants access to the requested application and, as described above, requests (step 270) the session key from the ticket service 60.

In another embodiment, the ticket service 60 performs additional checks on the session ID. For example, the ticket service 60 performs checks on the session ID for early detection of replay (i.e., checking that the session ID has not been previously transmitted to the ticket service 60) and/or Denial of Service (DoS) attacks (i.e., flooding and eventually disabling a remote server with illegitimate packets of data). In yet another embodiment, the web server 20 transmits the first and second portion of the ticket to the application server 15 before the application server 15 requests it (step 270), thus eliminating the request in step 270. In this embodiment, the application server 15 stores the session key in its local memory and retrieves from its local memory the session key after the client 10 presents (step 265) the session ID to the application server 15.

After the application server 15 obtains (step 280) the session key, the application server 15 uses the session key to encrypt communications to the client 10 and to decrypt communications from the client 10 over the application communication channel 25. Similarly, the client 10 uses the session key that the client 10 obtained from the ticket transmitted over the secure web communication channel 30 to decrypt communications from the application server 15 and to encrypt communications to the application server 15. Because the client 10 and the application server 15 use the session key to encrypt and decrypt communications over the application communication channel 25, the client 10 and the application server 15 establish (step 290) the secure communication link 50 over the previously non-secure application communication channel 25. Moreover, because the client 10 and the application server 15 have the session key without transmitting the ticket over the non-secure application communication channel 25 (and thus potentially revealing the session key to third parties), the client 10 and the application server 15 strengthen the security of the communication link 50 over the previously non-secure application communication channel 25.

In one embodiment, the application communication channel 25 is made secure using the SSL protocol. In this embodiment, the ticket service 60 substitutes an application server certificate for the session key in the ticket. The client 10 uses the application server certificate to communicate with the application server 15. The application server certificate is downloaded to the client 10 over the web communication channel 30 in response to a request for the ticket. Therefore, because the application server certificate is downloaded to the client 10 over a secure link (i.e., the web communication channel 30), the application server certificate does not need to be signed by a well-known public CA. Although the client 10 did not have the application server's certificate or the CA key in advance, an authenticated secure connection is established over the application communication channel 25 using the application server certificate included in the ticket.

For example, if the client 10 requests another SSL component (e.g., a separate instance or implementation of the requested software application) and the client 10 does not have the CA certificate in its local memory (e.g., database, local disk, RAM, ROM), the client 10 can use the application server certificate transmitted in the ticket to establish an authenticated secure connection over the application communication channel 25. More specifically, the client 10 uses the application server certificate transmitted in the ticket when the client 10 does not have a CA root certificate stored in its local memory that is associated with the requested SSL component (or when the client 10 has an incomplete list of CA certificates that does not include a CA certificate for the requested SSL component) and the client 10 cannot access the CA database of the web browser 40. Furthermore, because a signed CA certificate is needed for the web server 20 but is not needed for an application server 15 (i.e., each application server 15 that is a member of a server farm), the costs (and overhead) of obtaining the required number of signed CA certificates for secure communication is reduced. In another embodiment, the application server 15 stores a private key for decryption of messages that are encrypted with a corresponding public key. The ticket service 60 consequently transmits the corresponding public key of the application server 15 to the client 10 to encrypt communications.

In this embodiment, the session ID still provides additional value, in that it ensures that the client 10 can gain access to the requested application and can gain access one time because ticket service 60 (or web server 20) monitors the ticket (i.e., the session ID). Furthermore, if the application server 15 and the client 10 use different session keys to encrypt and decrypt communications over the application communication channel 25, an eavesdropper cannot modify the session ID transmitted by the client 10 to the application server 15 because the session ID and the cryptographic checksum do not match the checksum expected by the application server 15 (i.e., integrity check). Therefore, the client 10 and the application server 15 determine when different session keys are used (e.g., "man-in-the-middle" attack) by the application server 15 and the client 10 to encrypt and decrypt communications over the application communication channel 25.

In a further embodiment, the session key is substantially equivalent to a null value (i.e., the ticket contains only a nonce or a nonce and a constant value for the session key). When the session key is substantially equivalent to a null value, the client 10 does not transmit the user's login information (e.g., password) between the client 10 and the application server 15 over the non-secure application communication channel 25. Therefore, because the ticket is only valid for a single use and only grants access to a previously authorized resource (e.g., the ICA client 41), the external password exposure can be avoided and individual session level access control can be achieved, even with a null or fixed session key value.

Additionally, because no information is pre-configured into the web browser 40 or the client 10 in order to remotely display the requested application (i.e., because the client 10 does not need to be populated with a server certificate or a CA certificate), the present method is a "zero-install" solution for secure access to desktop applications over the web. Further, the web browser 40 receives the ticket and the ICA client 41 from the web server 20 over the communication channel 30. In this embodiment, the web server 20 transmits the ticket and a MIME type document, as described above, specifying that the data includes a "document" for the ICA client 41 (as a helper application). The MIME type document invokes the ICA client 41 and the web browser 40 transfers the ticket to the ICA client 41, thus allowing the exploitation of the security of the communication channel 30 to secure the application communication channel 25 without having the ICA client 41 pre-installed on the client 10. Having described certain embodiments of the invention, it will now become apparent to one of skill in the art that other embodiments incorporating the concepts of the invention may be used. Therefore, the invention should not be limited to certain embodiments, but rather should be limited only by the spirit and scope of the following claims.

What invention claimed is:

1. A method for establishing a secure communication channel between a client and an application server comprising the steps of:
   (a) receiving, at a web server, a request from a client to have an application program executed on an application server and to have output from said application program executing on said application server transmitted to said client;
   (b) generating, by a ticket service, a ticket having an identifier and a session key;
   (c) obtaining, by said web server, said ticket from said ticket service;
   (d) transmitting, by said web server, said ticket to said client over a secure communication channel;
   (e) transmitting, by said client, said identifier from said ticket to said application server;
   (f) obtaining, by said application server, a copy of said session key from said ticket service using said identifier;
   (g) establishing an application communication channel between said client and said application server;
   (h) executing, by said application server, said application program identified in said request;
   (i) transmitting, by said application server, output of said application program over said application communication channel via a remote display protocol; and
   (j) encrypting said output communicated to said client over said application communication channel using said session key.

2. The method of claim 1 wherein said ticket service resides on said web server.

3. The method of claim 1 wherein step (f) further comprises transmitting, by said application server, said identifier to said web server over a server communication channel.

4. The method of claim 3 further comprising receiving, by said application server, a response to transmitting said identifier to said web server, said response including said session key.

5. The method of claim 3 further comprising validating, by said web server, said identifier.

6. The method of claim 5 wherein said validating step further comprises confirming by said web server that said identifier is received by said web server within a predetermined time frame.

7. The method of claim 3 further comprising establishing said server communication channel as a secure communication channel.

8. The method of claim 1 wherein said session key is substantially equivalent to a null value.

9. The method of claim 8 wherein said null value is a constant value.

10. The method of claim 1 wherein said identifier is a nonce.

11. The method of claim 1 wherein said identifier is an application server certificate.

12. The method of claim 1 wherein step (j) further comprises decrypting communications from said application server using said session key.

13. The method of claim 1 wherein said remote display protocol is the Independent Computing Architecture protocol.

14. The method of claim 1 wherein said remote display protocol is the Remote Desktop Protocol.

15. A method for establishing a secure communication channel between a client and an application server comprising the steps of:
   (a) transmitting to a web server a request to have an application server execute an application program and transmit output from said application program executing on said application server;
   (b) establishing a secure web communication channel between a web browser executing on said client and said web server;
   (c) receiving a ticket having an identifier and a session key from said web server over said secure web communication channel;
   (d) establishing an application communication channel with said application server over said application communication channel;
   (e) transmitting said identifier from said ticket to said application server over an application communication channel to provide said application server with information for obtaining a copy of said session key;
   (f) receiving output of said application program, identified in said request, from said application server over said application communication channel via a remote display protocol; and
   (g) decrypting said output using said session key.

16. The method of claim 15 wherein said ticket is generated by a ticket service.

17. The method of claim 16 wherein said ticket service resides on said web server.

18. The method of claim 15 wherein said identifier is an application server certificate.

19. The method of claim 15 wherein step (b) further comprises using secure socket layer technology to establish said secure web communication channel.

20. The method of claim 15 wherein step (e) further comprises transmitting a password to said application server.

21. The method of claim 15 wherein said session key is substantially equivalent to a null value.

22. The method of claim 15 wherein said session key is substantially equivalent to a null value.

23. The method of claim 15 wherein step (g) further comprises encrypting communications to said application server.

24. The method of claim 15 wherein said remote display protocol is the Independent Computing Architecture protocol.

25. The method of claim 15 wherein said remote display protocol is the Remote Desktop Protocol.

26. A method for establishing a secure communication channel between a client and an application server comprising the steps of:
   (a) receiving a request from a web server to execute an application program on behalf of a client and transmit to said client output from said application program executing on said application server;
   (b) receiving an identifier from said client;
   (c) obtaining from said web server a copy of a session key associated with said identifier;
   (d) establishing an application communication channel with said client;
   (e) executing said application program identified in said request;
   (f) transmitting output of said executing application program over said application communication channel via a remote display protocol; and
   (g) encrypting said output using said session key.

27. The method of claim 26 wherein step (b) comprises receiving a nonce from said client.

28. The method of claim 26 wherein said ticket is generated by a ticket service.

29. The method of claim 26 wherein said identifier is an application server certificate.

30. The method of claim 26 wherein step (b) further comprises receiving a password from said client.

31. The method of claim 26 wherein said ticket is generated by a ticket service.

32. The method of claim 31 wherein said application server receives a response to transmitting said identifier to said web server, said response including said session key.

33. The method of claim 31 wherein said web server validates said identifier.

34. The method of claim 26 wherein said ticket service resides on said web server.

35. The method of claim 34 wherein said web server validates said identifier is received by said web server within a predetermined time frame.

36. The method of claim 26 wherein step (c) further comprises transmitting by said application server said identifier to said web server over a server communication channel.

37. The method of claim 26 wherein said identifier is an application server certificate.

38. The method of claim 26 wherein said session key is substantially equivalent to a null value.

39. The method of claim 26 wherein said null value is a constant value.

40. The method of claim 26 wherein step (g) further comprises decrypting communications from said client.

41. The method of claim 26 wherein said remote display protocol is the Independent Computing Architecture protocol.

42. The method of claim 26 wherein said remote display protocol is the Remote Desktop protocol.

43. A communications system for establishing a secure communication channel between a client and an application server comprising:
- a ticket service generating a ticket associated with a client, said ticket having an identifier and a session key;
- a web server in communication with said ticket service;
- said web server receiving a request from said client to have an application program executed on an application server, obtaining said ticket from said ticket service, and transmitting said ticket to said client over a secure communication channel;
- said client transmitting said identifier from said ticket to said application server;
- said application server obtaining a copy of said session key from said ticket service using said identifier;
- said client and said application server establishing an application communication channel, said application server executing said application program identified in said request and transmitting output from said executing application program over said application communication channel via a remote display protocol; and
- said client and said application server encrypting communications using said session key.

44. The system of claim 43 wherein said ticket service resides on said web server.

45. The system of claim 43 further comprising said application server transmitting said identifier to said web server over a server communication channel.

46. The system of claim 45 further comprising said application server requesting a copy of said session key in response to receiving said identifier from said client.

47. The system of claim 46 further comprising said web server validating said identifier.

48. The system of claim 47 wherein said web server validates said identifier has not been previously received from said application server.

49. The system of claim 48 further comprising said web server transmitting said session key to said application server over said server communication channel.

50. The system of claim 47 wherein said web server validates said identifier when said identifier is received by said web server within a predetermined time frame.

51. The system of claim 46 further comprising said web server transmitting additional information to said application server over said server communication channel.

52. The system of claim 51 wherein said additional information comprises login information of a user of said client.

53. The system of claim 52 wherein said additional information comprises a name of a software application executing on said application server.

54. The system of claim 45 wherein said server communication channel is a secure communication channel.

55. The system of claim 43 further comprising said client transmitting a password to said application server.

56. The system of claim 43 further comprising said ticket service transmitting information corresponding to at least one of said client and a user operating said client to said application server.

57. A communications system for establishing a secure communication channel between a client and an application server comprising:
- a web browser on a client establishing a secure web communication channel with a web server, said web browser: transmitting to said web server a request to have an application server execute an application program and transmit to said client output of said application program executing on said application server; receiving a ticket associated with said client from said web server, said ticket having an identifier and a session key; and transmitting said identifier from said ticket to said application server; and
- an application client on said client establishing an application communication channel with said application server, said application client receiving output of said application program, identified in said request, executing on said application server, over said application communication channel via a remote display protocol and decrypting said output using said session key.

58. The system of claim 57 wherein said web browser receives additional information from said web server over said secure web communication channel.

59. The system of claim 58 wherein said additional information further comprises an address of said application server.

60. The system of claim 57 wherein said application client transmits a password of a user operating said client to said application server.

61. The system of claim 57 wherein said identifier is an application server certificate.

62. The system of claim 57 wherein said web browser uses secure socket layer technology to establish said secure web communication channel.

63. The system of claim 57 wherein said identifier is a nonce.

64. The system of claim 57 wherein said session key is substantially equivalent to a null value.

65. The system of claim 57 wherein said null value is a constant value.

66. The system of claim 57 wherein said remote display protocol is the Independent Computing Architecture protocol.

67. The system of claim 57 wherein said remote display protocol is the Remote Display Protocol.

68. The system of claim 57 wherein said client encrypts communications to said application server using said session key.

69. A communications system for establishing a secure communication channel between a client and an application server comprising:
- a ticket service generating a ticket associated with a client, said ticket having an identifier and a session key;
- a web server in communication with said ticket service, said web server receiving a request from said client to have an application program executed on said client's behalf and to have output of said application program transmitted to said client, said web server transmitting said ticket to said client over a secure web communication channel;
- an application server receiving said identifier from said ticket from said client, obtaining a copy of said session key from said web server, establishing an application communication channel with said client, executing said application program, transmitting output from said application program identified in said request to said client over said application communication channel via a remote display protocol, and encrypting said output using said session key.

70. The system of claim 69 wherein said ticket service resides on said web server.

71. The system of claim 69 wherein said application server obtains a copy of said session key from said web server in response to receiving said identifier from said client.

72. The system of claim 69 wherein said web server validates said identifier.

73. The system of claim 72 wherein said web server validates said identifier has not been previously received from said application server.

74. The system of claim 72 wherein said web server validates said identifier is received by said web server within a predetermined time frame.

75. The system of claim 72 wherein said web server transmits said session key to said application server over a server communication channel in response to receiving said identifier from said application server.

76. The system of claim 75 wherein said server communication channel is a secure communication channel.

77. The system of claim 75 wherein said web server transmits additional information to said application server over said server communication channel.

78. The system of claim 77 wherein said additional ticket information further comprises login information of a user of said client.

79. The system of claim 77 wherein said additional ticket information further comprises a name of a software application executing on said application server.

80. The system of claim 72 wherein said client transmits a password of a user operating said client to said application server.

81. The system of claim 72 wherein said ticket service transmits information corresponding to at least one of said client and a user operating said client to said application server.

82. The system of claim 72 wherein said identifier is an application server certificate.

83. The system of claim 72 wherein said identifier is a nonce.

84. The system of claim 72 wherein said session key is substantially equivalent to a null value.

85. The system of claim 72 wherein said null value is a constant value.

86. The system of claim 72 wherein said secure web communication channel is established using secure socket layer technology.

87. The system of claim 69 wherein said remote display protocol is the Independent Computing Architecture protocol.

88. The system of claim 69 wherein said remote display protocol is the Remote Desktop Display Protocol.

89. The system of claim 69 wherein said application server decrypts communications from said client using said session key.

* * * * *